(12) United States Patent
Yalcin

(10) Patent No.: US 10,494,525 B2
(45) Date of Patent: Dec. 3, 2019

(54) POLYAMIDE COMPOSITION INCLUDING HOLLOW GLASS MICROSPHERES AND ARTICLES AND METHODS RELATING TO THE SAME

(71) Applicant: 3M INNOVATIVE PROPERTIES COMPANY, St. Paul, MN (US)

(72) Inventor: Baris Yalcin, Roswell, GA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/553,777

(22) PCT Filed: Feb. 24, 2016

(86) PCT No.: PCT/US2016/019326
§ 371 (c)(1),
(2) Date: Aug. 25, 2017

(87) PCT Pub. No.: WO2016/138113
PCT Pub. Date: Sep. 1, 2016

(65) Prior Publication Data
US 2018/0030270 A1 Feb. 1, 2018

Related U.S. Application Data

(60) Provisional application No. 62/121,991, filed on Feb. 27, 2015.

(51) Int. Cl.
| C08L 77/02 | (2006.01) |
| C08L 23/16 | (2006.01) |
| C08L 77/06 | (2006.01) |
| C08K 9/06  | (2006.01) |
| C08L 51/04 | (2006.01) |
| C08L 51/06 | (2006.01) |

(52) U.S. Cl.
CPC ............... *C08L 77/02* (2013.01); *C08K 9/06* (2013.01); *C08L 23/16* (2013.01); *C08L 51/04* (2013.01); *C08L 51/06* (2013.01); *C08L 77/06* (2013.01); *C08L 2205/03* (2013.01); *C08L 2205/06* (2013.01); *C08L 2205/08* (2013.01)

(58) Field of Classification Search
CPC .. C08K 7/24; C08K 9/06; C08L 51/04; C08L 51/06; C08L 77/02; C08L 77/06
See application file for complete search history.

(56) References Cited

U.S. PATENT DOCUMENTS

| 2,978,340 | A | 4/1961 | Veatch |
| 3,030,215 | A | 4/1962 | Veatch |
| 3,129,086 | A | 4/1964 | Veatch |
| 3,230,064 | A | 1/1966 | Veatch |
| 3,365,315 | A | 1/1968 | Beck |
| 4,391,646 | A | 7/1983 | Howell |
| 4,692,480 | A | 9/1987 | Takahashi |
| 4,767,726 | A | 8/1988 | Marshall |
| 4,923,520 | A | 5/1990 | Anzai |
| 5,006,601 | A | 4/1991 | Lutz |
| 5,695,851 | A | 12/1997 | Watanabe |
| 6,319,976 | B1 * | 11/2001 | DeNicola, Jr. ........ C08F 255/00 523/212 |
| 6,455,630 | B1 | 9/2002 | Rigosi |
| 6,491,984 | B2 | 12/2002 | Rigosi |
| 6,586,073 | B2 | 7/2003 | Perez |
| 6,753,080 | B1 | 6/2004 | Sebastian |
| 7,365,144 | B2 | 4/2008 | Ka |
| 7,658,794 | B2 | 2/2010 | Gleeson |
| 9,006,302 | B2 | 4/2015 | Amos |
| 2004/0033905 | A1 | 2/2004 | Shinbach |
| 2004/0242737 | A1 | 12/2004 | Topulos |
| 2006/0100375 | A1 | 5/2006 | Flat |
| 2006/0105053 | A1 | 5/2006 | Marx |
| 2006/0122049 | A1 | 6/2006 | Marshall |
| 2007/0104943 | A1 | 5/2007 | D'Souza |
| 2007/0116942 | A1 | 5/2007 | D'Souza |

(Continued)

FOREIGN PATENT DOCUMENTS

| CN | 101775173 | 7/2010 |
| CN | 101851371 | 10/2010 |

(Continued)

OTHER PUBLICATIONS

Arkles, "Silane Coupling Agents: Connecting Across Boundaries", Version 2.0, Gelest, Inc., 2006, pp. 1-60.
Pisharath, "Rheology—Morphology Relationships in Nylon—LCP Hybrid Composites", Composites Science and Technology, 2006, vol. 66, No. 15, pp. 2971 to 2979.
Seymour, "Origin and Early Development of Rubber-Toughened Plastics", Rubber-Toughened Plastics, American Chemical Society, 1989, pp. 1-13.

(Continued)

*Primary Examiner* — Edward J Cain

(57) ABSTRACT

The composition can include a polyamide, hollow glass microspheres having amino groups on at least a portion of their surfaces, and an impact modifier comprising at least one of polyolefin units or polydiene units and at least one of carboxylic acid or carboxylic acid anhydride functional groups. The composition can include a matrix of a polyamide modified with an impact modifier comprising at least one of polyolefin units or polydiene units and hollow glass microspheres dispersed in the matrix. At least some of the impact modifier and the polyamide share at least one of an amide bond, an imide bond, or a carboxyl-amine noncovalent bond, and at least some of the hollow glass microspheres and the matrix share at least one of an amide bond, an imide bond, or a carboxyl-amine noncovalent bond. The impact modifier is present in an amount of at least about 5 weight percent.

20 Claims, No Drawings

(56) References Cited

U.S. PATENT DOCUMENTS

| | | |
|---|---|---|
| 2007/0155858 A1 | 7/2007 | Israelson |
| 2011/0130506 A1 | 6/2011 | Lee |
| 2012/0316261 A1* | 12/2012 | Bradley ............... C08L 77/02 523/219 |
| 2016/0326351 A1 | 11/2016 | Yalcin |
| 2016/0326352 A1 | 11/2016 | Yalcin |

FOREIGN PATENT DOCUMENTS

| | | |
|---|---|---|
| WO | WO 2006-081968 | 8/2006 |
| WO | WO 2011-160183 | 12/2011 |
| WO | WO 2012-151178 | 11/2012 |
| WO | WO 2013-138158 | 9/2013 |
| WO | WO 2014-008123 | 1/2014 |
| WO | WO 2014-152538 | 9/2014 |

OTHER PUBLICATIONS

Yalcin, "Polymer Composites with Hollow Glass Microspheres: Processing, Properties and Applications", Advanced Materials Division, 3M Industrial Business Group, 2012, pp. 1-59.

International Search report for PCT International Application No. PCT/US2016/019326 dated May 25, 2016, 3 pages.

* cited by examiner

POLYAMIDE COMPOSITION INCLUDING HOLLOW GLASS MICROSPHERES AND ARTICLES AND METHODS RELATING TO THE SAME

CROSS REFERENCE TO RELATED APPLICATION

This application is a national stage filing under 35 U.S.C. 371 of PCT/US2016/019326, filed Feb. 24, 2016, which claims priority to U.S. Provisional Application No. 62/121,991, filed Feb. 27, 2015, the disclosure of which is incorporated by reference in its entirety herein.

BACKGROUND

Hollow glass microspheres having an average diameter of less than about 500 micrometers, also commonly known as "glass microbubbles", "glass bubbles", "hollow glass beads", or "glass balloons" are widely used in industry, for example, as additives to polymeric compositions. In many industries, hollow glass microspheres are useful, for example, for lowering weight and improving processing, dimensional stability, and flow properties of a polymeric composition. Generally, it is desirable that the hollow glass microspheres be strong enough to avoid being crushed or broken during processing of the particular polymeric compound. Hollow glass microspheres have been reported to be useful in polyamide compositions for certain applications. See, for example, Int. App. Publ. No. WO 2006/081968 (Endtner et al.).

SUMMARY

In one aspect, the present disclosure provides a composition including a polyamide, hollow glass microspheres having amino groups on at least a portion of their surfaces, and an impact modifier comprising at least one of polyolefin units or polydiene units and at least one of carboxylic acid or carboxylic acid anhydride functional group. The impact modifier is present in an amount of at least about 5 weight percent, based on the total weight of the composition.

In another aspect, the present disclosure provides an article preparable from or prepared from the composition described above.

In another aspect, the present disclosure provides a composition including a matrix comprising a polyamide modified with an impact modifier comprising at least one of polyolefin units or polydiene units and hollow glass microspheres dispersed in the matrix. At least some of the impact modifier and the polyamide share at least one of an amide bond, an imide bond, or a carboxyl-amine noncovalent bond, and at least some of the hollow glass microspheres and the matrix share at least one of an amide bond, an imide bond, or a carboxyl-amine noncovalent bond. The impact modifier is present in an amount of at least about 5 weight percent, based on the total weight of the composition.

In another aspect, the present disclosure provides an article including the composition described above.

In another aspect, the present disclosure provides a method of making an article, the method includes shaping the composition described above to make the article.

In this application, terms such as "a", "an" and "the" are not intended to refer to only a singular entity, but include the general class of which a specific example may be used for illustration. The terms "a", "an", and "the" are used interchangeably with the term "at least one". The phrases "at least one of" and "comprises at least one of" followed by a list refers to any one of the items in the list and any combination of two or more items in the list. All numerical ranges are inclusive of their endpoints and non-integral values between the endpoints unless otherwise stated.

The term "crosslinked" refers to joining polymer chains together by covalent chemical bonds, usually via crosslinking molecules or groups, to form a network polymer. Therefore, a chemically non-crosslinked polymer is a polymer that lacks polymer chains joined together by covalent chemical bonds to form a network polymer. A crosslinked polymer is generally characterized by insolubility, but may be swellable in the presence of an appropriate solvent. A non-crosslinked polymer is typically soluble in certain solvents and is typically melt-processable. A polymer that is chemically non-crosslinked may, in some cases, be referred to as a linear polymer.

A polar functional group is a functional group that includes at least one atom that is more electronegative than carbon. Common elements of organic compounds that are more electronegative than carbon are oxygen, nitrogen, sulfur, and halogens. In some embodiments, a polar functional group is a functional group that includes at least one oxygen atom. Such groups include hydroxyl and carbonyl groups (e.g., such as those in ketones, aldehydes, carboxylic acids, carboxyamides, carboxylic acid anhydrides, and carboxylic acid esters).

The term "polyamide" can be used interchangeably with the generic term "nylon".

The term "impact modifier" can be used interchangeably with the term "elastomer."

The above summary of the present disclosure is not intended to describe each disclosed embodiment or every implementation of the present disclosure. The description that follows more particularly exemplifies illustrative embodiments. It is to be understood, therefore, that the following description should not be read in a manner that would unduly limit the scope of this disclosure.

DETAILED DESCRIPTION

Polyamides typically have a useful combination of strength, stiffness, toughness, abrasion resistance, low coefficient of friction, and chemical resistance over a wide range of temperatures and relative humidity levels. However, limitations of polyamides have been observed under certain circumstances. For example, polyamides may be brittle at low temperature and have poor resistance to crack propagation. Polyamides may also be notch-sensitive, have low impact strength below the glass transition temperature, have low melt strength, and also have a tendency to be hygroscopic. To alleviate these shortcomings, impact-modified polyamides have been developed. For impact-modified polyamides, maleic anhydride grafted elastomers are typically used as impact modifiers.

We have found that the addition of hollow glass microspheres into a polyamide renders them lightweight but adversely affects impact strength. Impact strength is an attribute of the polyamide phase, and the addition of hollow glass microspheres dilutes the polyamide phase. The reduction of impact strength is particularly pronounced for impact-modified polyamides as shown in Table 2 in the Examples, below. The incorporation of 10 percent by weight of hollow glass microspheres decreases the impact strength of an impact-modified polyamide 15 times.

We have now also found that the combination of an impact modifier comprising polyolefin or polydiene units and at least one of carboxylic acid or carboxylic acid anhydride functional groups and hollow glass microspheres having amino groups on at least a portion of their surfaces can be added to polyamides of different impact strengths to provide unexpected impact strengths. Polyamide compositions disclosed herein including amino-functional hollow glass microspheres have surprisingly better impact strength than comparable polyamide compositions but having non-functionalized hollow glass microspheres instead of amino-functional hollow glass microspheres. Also surprisingly, the superiority of amino-functional hollow glass microspheres over non-functionalized hollow glass microspheres for improving impact strength is not observed below a certain level of impact modifier: five weight percent based on the total weight of the composition. Below this level of impact modifier, the impact strength of compositions including non-functionalized hollow glass microspheres is the same or better than the impact strength of compositions including amino-functional hollow glass microspheres.

Examples of polyamides useful for the compositions according to the present disclosure include those that are made by ring-opening polymerization of at least one lactam having more than three atoms in its ring (e.g., β-propiolactam, γ-butyrolactam, δ-valerolactam, ε-caprolactam, and laurolactam), and those made by a condensation reaction of at least one ω-amino acid (e.g., aminocaproic acid, 7-aminoheptanoic acid, 11-aminoundecanoic acid, 12-aminododecanoic acid, and 9-aminononanoic acid) or condensation between at least one diacid (e.g., adipic acid, sebacic acid, dodecanedioic acid, glutaric acid, terephthalic acid, 2-methylterephthalic acid, isophthalic acid, and naphthalenedicarboxylic acid) and at least diamine (e.g., tetramethylenediamine, hexamethylenediamine, nonamethylendiamine, decamethylenediamine, undecamethylenediamine, dodecamethylenediamine, p-aminoaniline, and metaxylenediamine). Mixtures of one or more of each of these monomers may be useful. The polyamides useful for the compositions according to the present disclosure may be semi-crystalline or non-crystalline. For polyamines made from diacids and diamines, incorporation of a small amount (e.g., up to five mole percent) of polyfunctional compounds having three or more functional groups (e.g., trimellitic acid and pyromellitic acid) may also be useful.

Examples of polyamides useful for the compositions according to the present disclosure include nylon-6; nylon-7; nylon-8; nylon-10; nylon-12; nylon-4,6; nylon-6,6; nylon-6,9; nylon-5,10; nylon-6,10; nylon-6,11; and nylon 6,12. Mixtures of these in any ratio may be useful. In some embodiments, the composition according to the present disclosure comprises at least one of nylon-6 or nylon-6,6. Many polyamides useful for the compositions disclosed herein can be obtained commercially, for example, from E.I. du Pont de Nemours & Co. (Wilmington, Del.) and BASF (Wyandotte, Mich.).

In the composition according to the present disclosure, the polyamide is typically the predominant component. In general, the polyamide provides at least 40 percent by weight, based on the total weight of the composition. In some embodiments, the polyamide provides at least 50, 60, or 65 percent by weight, based on the total weight of the composition. In some embodiments, the polyamide provides up to 93, 85, or 75 percent by weight, based on the total weight of the composition. In some embodiments, the polyamide is present in a range from 40 percent to 93 percent, 50 percent to 85 percent, or 65 percent to 75 percent by weight, based on the total weight of the composition.

The impact modifier useful for the compositions according to the present disclosure comprises at least one of polyolefin units or polydiene units and at least one of carboxylic acid or carboxylic acid anhydride functional groups. Polyolefin units are units from polymerized polyolefins. In some embodiments, polyolefin units can be represented by formula —[$CH_2$—$CHR^{10}$]— wherein $R^{10}$ is a hydrogen or alkyl. In some embodiments, $R^{10}$ has up to 10 carbon atoms or from one to eight or one to six carbon atoms. Polydiene units are units from polymerized polydienes (e.g., polybutadiene or polyisoprene). In some embodiments, the impact modifier is chemically non-cross-linked. Thus, in some embodiments, the impact modifier may be considered a thermoplastic elastomer. In some embodiments, the impact modifier is an ethylene-propylene elastomer, an ethylene-octene elastomer, an ethylene-propylene-diene elastomer, an ethylene-propylene-octene elastomer, polybutadiene, a butadiene copolymer, polybutene, a styrene-butadiene block copolymer elastomer, or a combination thereof, each of which comprises at least one of carboxylic acid or carboxylic acid anhydride functional groups. In some embodiments, the impact modifier is an ethylene-octene elastomer. In some embodiments, the impact modifier is an ethylene-propylene-diene elastomer.

In some embodiments, the impact modifier is an ABA block copolymer elastomer in which the A blocks are polystyrenic, and the B blocks are conjugated dienes (e.g., lower alkylene dienes). The A block is generally formed predominantly of substituted (e.g., alkylated) or unsubstituted styrenic moieties (e.g., polystyrene, poly(alpha-methylstyrene), or poly(t-butylstyrene)), having an average molecular weight from about 4,000 to 50,000 grams per mole. The B block(s) is generally formed predominantly of conjugated dienes (e.g., isoprene, 1,3-butadiene, or ethylene-butylene monomers), which may be substituted or unsubstituted and which may be hydrogenated, and has an average molecular weight from about 5,000 to 500,000 grams per mole. Thus, a styrene-butadiene block copolymer elastomer can include substitution on the styrene or butadiene, the butadiene units may be saturated. The A and B blocks may be configured, for example, in linear, radial, or star configurations. An ABA block copolymer may contain multiple A and/or B blocks, which blocks may be made from the same or different monomers. A typical block copolymer is a linear ABA block copolymer, where the A blocks may be the same or different, or a block copolymer having more than three blocks, predominantly terminating with A blocks.

Any of these impact modifiers may be modified, in some embodiments, with carboxylic acid anhydride groups (in some embodiments, maleic anhydride groups). Some impact modifiers useful for practicing the present disclosure are commercially available. For example, certain elastomers comprising at least one of a carboxylic acid or carboxylic acid anhydride functional groups are available, for example, from Dow Chemical Company, Midland, Mich., under the trade designation "AMPLIFY", from Addivant, Danbury, Conn., under the trade designation "ROYALTUFF", and from E.I. du Pont de Nemours & Co. under the trade designation "FUSABOND". Styrene/polydiene block copolymer elastomers modified with maleic anhydride are available, for example, from Kraton Polymers, Houston, Tex., under the trade designation "KRATON FG".

In some embodiments, the impact modifier may be selected to have a relatively low viscosity as measured by melt flow index. A combination of impact modifiers having different melt flow indexes may also be useful. In some embodiments, at least one of the impact modifiers has a melt flow index at 190° C. and 2.16 kilograms of at least 10 grams per 10 minutes (in some embodiments, at least 11, 12, or 13 grams per 10 minutes). The melt flow index of the impact modifiers is measured by ASTM D1238-13: Standard Test Method for Melt Flow Rates of Thermoplastics by Extrusion Plastometer.

The impact modifier comprising at least one of polyolefin units or polydiene units and at least one of carboxylic acid or carboxylic acid anhydride functional groups is present in the composition according to the present disclosure in an amount of at least five percent by weight, based on the total weight of the composition. In some embodiments, the impact modifier is present in the composition in a range from 5 percent to 30 percent by weight, based on the total weight of the composition. In some embodiments, impact modifier is present in the composition in amount of at least 5, 7.5, 10, 12, 14, or 15 percent and up to about 20, 19.99, 19.95, 19.5, 15, 14.99, 14.95, or 14.5 percent by weight, based on the total weight of the composition.

Other common types of impact modifiers such as ground rubber, core-shell particles, and particles available, for example, from Akzo Nobel, Amsterdam, The Netherlands, under the trade designation "EXPANCEL" are typically chemically crosslinked and may not be useful in the compositions according to the present disclosure. Many of these impact modifiers increase the viscosity of a composition, making the composition less suitable for some polymer processing techniques (e.g., injection molding). In addition, "EXPANCEL" particles and similar particles require more strict thermal control and more precise handling than the impact modifiers described herein, which can present challenges during processing. In some embodiments, compositions according to the present disclosure are free of or substantially free of any of these impact modifiers. In this regard, the term "substantially free" refers to the composition having up to or less than 1, 0.5, or 0.1 percent by weight of any of these impact modifiers, based on the total weight of the composition.

Nitrogen-containing impact modifiers for polyamides are reported in WO2006/081968 (Endtner et al.). These include allantoin, cyanuric acid, dicyandiamide, glycoluril, guanidine, melamine, condensation products of melamine (e.g., heptazine, melam, or melom), and adducts of melamine with acids (e.g., cyanuric acid, phosphoric acid, or condensed phosphoric acids). In some embodiments, compositions according to the present disclosure are free of or substantially free of any of these impact modifiers. In this regard, the term "substantially free" refers to the composition having up to or less than 1, 0.5, or 0.1 percent by weight of any of these impact modifiers, based on the total weight of the composition.

It has been reported that when maleic anhydride-modified elastomers are combined with polyamides under certain conditions, a reaction can take place between the end groups or backbone of the polyamide and the maleic anhydride to form maleimide groups, which provide a covalent connection between the polyamide and the elastomer. Accordingly, in some embodiments, the polyamide and the impact modifier described above in any of its embodiments can share a bond. The bond may be an amide bond, an imide bond, or a carboxyl-amine non-covalent bond, depending on the functional group on the impact modifier. For example, a maleic anhydride-modified impact modifier can be covalently connected to the polyamide through maleimide groups. Other carboxylic acid anhydride-modified impact modifiers may be connected to the polyamide through amide groups. Carboxylic acid-modified polyolefins may share covalent or non-covalent bond with the polyamide, for example, a carboxylic acid-amine non-covalent bond. The non-covalent bond can be an ionic bond, hydrogen bond, or dipole interaction. When the polyamide and at least some of the impact modifier share a bond, the polyamide and impact modifier together provide a matrix in which the hollow glass microspheres described below are dispersed. Some polyamides modified with impact modifiers useful for the compositions disclosed herein can be obtained commercially, for example, from E.I. du Pont de Nemours & Co. under the trade designation "ZYTEL".

Hollow glass microspheres useful in the compositions and methods according to the present disclosure can be made by techniques known in the art (see, e.g., U.S. Pat. No. 2,978,340 (Veatch et al.); U.S. Pat. No. 3,030,215 (Veatch et al.); U.S. Pat. No. 3,129,086 (Veatch et al.); and U.S. Pat. No. 3,230,064 (Veatch et al.); U.S. Pat. No. 3,365,315 (Beck et al.); U.S. Pat. No. 4,391,646 (Howell); and U.S. Pat. No. 4,767,726 (Marshall); and U.S. Pat. App. Pub. No. 2006/0122049 (Marshall et. al). Techniques for preparing hollow glass microspheres typically include heating milled frit, commonly referred to as "feed", which contains a blowing agent (e.g., sulfur or a compound of oxygen and sulfur). Frit can be made by heating mineral components of glass at high temperatures until molten glass is formed.

Although the frit and/or the feed may have any composition that is capable of forming a glass, typically, on a total weight basis, the frit comprises from 50 to 90 percent of $SiO_2$, from 2 to 20 percent of alkali metal oxide, from 1 to 30 percent of $B_2O_3$, from 0.005-0.5 percent of sulfur (for example, as elemental sulfur, sulfate or sulfite), from 0 to 25 percent divalent metal oxides (for example, CaO, MgO, BaO, SrO, ZnO, or PbO), from 0 to 10 percent of tetravalent metal oxides other than $SiO_2$ (for example, $TiO_2$, $MnO_2$, or $ZrO_2$), from 0 to 20 percent of trivalent metal oxides (for example, $Al_2O_3$, $Fe_2O_3$, or $Sb_2O_3$), from 0 to 10 percent of oxides of pentavalent atoms (for example, $P_2O_5$ or $V_2O_5$), and from 0 to 5 percent fluorine (as fluoride) which may act as a fluxing agent to facilitate melting of the glass composition. Additional ingredients are useful in frit compositions and can be included in the frit, for example, to contribute particular properties or characteristics (for example, hardness or color) to the resultant glass bubbles.

In some embodiments, the hollow glass microspheres useful in the compositions and methods according to the present disclosure have a glass composition comprising more alkaline earth metal oxide than alkali metal oxide. In some of these embodiments, the weight ratio of alkaline earth metal oxide to alkali metal oxide is in a range from 1.2:1 to 3:1. In some embodiments, the hollow glass microspheres have a glass composition comprising $B_2O_3$ in a range from 2 percent to 6 percent based on the total weight of the glass bubbles. In some embodiments, the hollow glass microspheres have a glass composition comprising up to 5 percent by weight $Al_2O_3$, based on the total weight of the hollow glass microspheres. In some embodiments, the glass composition is essentially free of $Al_2O_3$. "Essentially free of $Al_2O_3$" may mean up to 5, 4, 3, 2, 1, 0.75, 0.5, 0.25, or 0.1 percent by weight $Al_2O_3$. Glass compositions that are "essentially free of $Al_2O_3$" also include glass compositions having no $Al_2O_3$. Hollow glass microspheres useful for practicing the present disclosure may have, in some embodiments, a chemical composition wherein at least 90%, 94%, or even at least 97% of the glass comprises at least 67% $SiO_2$, (e.g., a range of 70% to 80% $SiO_2$), a range of 8% to 15% of an alkaline earth metal oxide (e.g., CaO), a range of 3% to 8% of an alkali metal oxide (e.g., $Na_2O$), a range of 2% to 6% $B_2O_3$, and a range of 0.125% to 1.5% $SO_3$. In some embodiments, the glass comprises in a range from 30% to 40% Si, 3% to 8% Na, 5% to 11% Ca, 0.5% to 2% B, and 40% to 55% 0, based on the total of the glass composition.

The "average true density" of hollow glass microspheres is the quotient obtained by dividing the mass of a sample of hollow glass microspheres by the true volume of that mass of hollow glass microspheres as measured by a gas pycnometer. The "true volume" is the aggregate total volume of the hollow glass microspheres, not the bulk volume. The average true density of the hollow glass microspheres useful for practicing the present disclosure is generally at least 0.30 grams per cubic centimeter (g/cc), 0.35 g/cc, or 0.38 g/cc. In some embodiments, the hollow glass microspheres useful for practicing the present disclosure have an average true density of up to about 0.65 g/cc. "About 0.65 g/cc" means 0.65 g/cc±five percent. In some of these embodiments, the average true density of the hollow glass microspheres is up to 0.6 g/cc or 0.55 g/cc. For example, the average true density of the hollow glass microspheres disclosed herein may be in a range from 0.30 g/cc to 0.65 g/cc, 0.30 g/cc to 0.6 g/cc, 0.35 g/cc to 0.60 g/cc, or 0.35 g/cc to 0.55 g/cc. Hollow glass microspheres having any of these densities can be useful for lowering the density of the composition according to the present disclosure, relative to polyamide compositions that do not contain hollow glass microspheres.

For the purposes of this disclosure, average true density is measured using a pycnometer according to ASTM D2840-69, "Average True Particle Density of Hollow Microspheres". The pycnometer may be obtained, for example, under the trade designation "ACCUPYC 1330 PYCNOMETER" from Micromeritics, Norcross, Ga., or under the trade designations "PENTAPYCNOMETER" or "ULTRA-PYCNOMETER 1000" from Formanex, Inc., San Diego, Calif. Average true density can typically be measured with an accuracy of 0.001 g/cc. Accordingly, each of the density values provided above can be ±five percent.

A variety of sizes of hollow glass microspheres may be useful. As used herein, the term size is considered to be equivalent with the diameter and height of the hollow glass microspheres. In some embodiments, the hollow glass microspheres can have a median size by volume in a range from 14 to 45 micrometers (in some embodiments from 15 to 40 micrometers, 20 to 45 micrometers, or 20 to 40 micrometers). The median size is also called the D50 size, where 50 percent by volume of the hollow glass microspheres in the distribution are smaller than the indicated size. For the purposes of the present disclosure, the median size by volume is determined by laser light diffraction by dispersing the hollow glass microspheres in deaerated, deionized water. Laser light diffraction particle size analyzers are available, for example, under the trade designation "SATURN DIGISIZER" from Micromeritics. The size distribution of the hollow glass microspheres useful for practicing the present disclosure may be Gaussian, normal, or non-normal. Non-normal distributions may be unimodal or multi-modal (e.g., bimodal).

The hollow glass microspheres useful in the compositions and methods according to the present disclosure typically need to be strong enough to survive the processing of the composition (e.g., extrusion or molding). A useful hydrostatic pressure at which ten percent by volume of the hollow glass microspheres collapses is at least about 20 (in some embodiments, at least about 38, 50, or 55) megapascals (MPa). "About 20 MPa" means 20 MPa±five percent. In some embodiments, a hydrostatic pressure at which ten percent by volume of the hollow glass microspheres collapses can be at least 100, 110, or 120 MPa. In some embodiments, a hydrostatic pressure at which ten percent, or twenty percent, by volume of the hollow glass microspheres collapses is up to 250 (in some embodiments, up to 210, 190, or 170) MPa. The hydrostatic pressure at which ten percent by volume of hollow glass microspheres collapses may be in a range from 20 MPa to 250 MPa, 38 MPa to 210 MPa, or 50 MPa to 210 MPa. For the purposes of the present disclosure, the collapse strength of the hollow glass microspheres is measured on a dispersion of the hollow glass microspheres in glycerol using ASTM D3102-72 "Hydrostatic Collapse Strength of Hollow Glass Microspheres"; with the exception that the sample size (in grams) is equal to 10 times the density of the glass bubbles. Collapse strength can typically be measured with an accuracy of ±about five percent. Accordingly, each of the collapse strength values provided above can be ±five percent.

Hollow glass microspheres useful for practicing the present disclosure can be obtained commercially and include those marketed by 3M Company, St. Paul, Minn., under the trade designation "3M GLASS BUBBLES" (e.g., grades S60, S60HS, iM30K, iM16K, S38HS, S38XHS, K42HS, K46, K37, and H50/10000). Other suitable hollow glass microspheres can be obtained, for example, from Potters Industries, Valley Forge, Pa., (an affiliate of PQ Corporation) under the trade designations "SPHERICEL HOLLOW GLASS SPHERES" (e.g., grades 110P8 and 60P18) and "Q-CEL HOLLOW SPHERES" (e.g., grades 30, 6014, 6019, 6028, 6036, 6042, 6048, 5019, 5023, and 5028), from Silbrico Corp., Hodgkins, Ill. under the trade designation "SIL-CELL" (e.g., grades SIL 35/34, SIL-32, SIL-42, and SIL-43), and from Sinosteel Maanshan Inst. of Mining Research Co., Maanshan, China, under the trade designation "Y8000". In some embodiments, hollow glass microspheres useful for practicing the present disclosure may be selected to have crush strengths of at least about 28 MPa, 34 MPa, 41 MPa, 48 MPa, or 55 MPa for 90% survival.

In some embodiments, the hollow glass microspheres are present in the composition according to the present disclosure at a level of at least 5 percent by weight, based on the total weight of the composition. In some embodiments, the hollow glass microspheres are present in the composition at least at 10, 12, or 13 percent by weight based on the total weight of the composition. In some embodiments, the hollow glass microspheres are present in the composition at a level of up to 30, 25, or 20 percent by weight, based on the total weight of the composition. For example, the hollow glass microspheres may be present in the composition in a range from 5 to 30, 10 to 25, 10 to 20, or 10 to 15 percent by weight, based on the total weight of the composition.

In the compositions according to the present disclosure, the hollow glass microspheres have amino groups on at least a portion of their surfaces. The amino groups may be primary, secondary, or tertiary amino groups. Amino groups can be incorporated onto the surface by treating the hollow glass microspheres with an amino-functional coupling agent. Examples of useful coupling agents include zirconates, silanes, or titanates. Typical titanate and zirconate coupling agents are known to those skilled in the art and a detailed overview of the uses and selection criteria for these materials can be found in Monte, S. J., Kenrich Petrochemicals, Inc., "Ken-React® Reference Manual—Titanate, Zirconate and Aluminate Coupling Agents", Third Revised Edition, March, 1995. If used, coupling agents are commonly included in an amount of about 1% to 3% by weight, based on the total weight of the hollow glass microspheres in the composition.

In some embodiments, the hollow glass microspheres are functionalized with an amino-functional silane. Suitable amino-functional silanes are coupled to glass surfaces through condensation reactions to form siloxane linkages with the siliceous glass. In some embodiments, a suitable amino-functional silane is represented by formula $Z_2N$-L-SiY$_x$Y'$_{3-x}$, wherein each Z is independently hydrogen, alkyl having up to 12 carbon atoms, or -L-SiY$_x$Y'$_{3-x}$; L is a multivalent alkylene group having up to 12 carbon atoms and optionally interrupted by one or more —O— groups or up to three —NR— groups, wherein R is hydrogen or alkyl; Y is a hydrolysable group (e.g., alkoxy having up to 12 carbon atoms, polyalkyleneoxy having up to 12 carbon atoms, or halogen), x is 1, 2, or 3, and Y' is a non-hydrolysable group (e.g., alkyl having up to 12 carbon atoms). Examples of amino-functional silanes of this formula include 3-aminopropyltrimethoxysilane; 3-aminopropyltriethoxysilane; 3-aminopropyltris(methoxyethoxyethoxy)silane; 3-aminopropylmethyldiethoxysilane; 3-aminopropylmethyldimethoxysilane; 3-aminopropyldimethylmethoxysilane; 3-aminopropyldimethylethoxysilane; 4-aminobutyltrimethoxysilane; 4-aminobutyltriethoxysilane; N-(2-aminoethyl)-3-aminopropylmethyldimethoxysilane; N-(2-aminoethyl)-3-aminopropyltributoxysilane; N-(2-aminoethyl)-3-aminopropylmethyldiethoxysilane; N-(2-aminoethyl)-3-aminopropyltrimethoxysilane; N-(2-aminoethyl)-3-aminopropyltriethoxysilane; N-(6-aminohexyl)aminopropyltrimethoxysilane; bis-(gamma-triethoxysilylpropyl)amine; bis(3-trimethoxysilylpropyl)amine; and 3-(N-methylamino)propyltrimethoxysilane. Suitable silane coupling strategies are outlined in Silane Coupling Agents: Connecting Across Boundaries, by Barry Arkles, pg 165-189, Gelest Catalog 3000-A Silanes and Silicones: Gelest Inc. Morrisville, Pa. Some hollow glass microspheres having amino groups on at least a portion of their surfaces are commercially available. For example, an aminoalkylsilane treated glass bubble is available from 3M Company, St. Paul, Minn., under the trade designation "L20090M". Other hollow glass microspheres having amino groups on at least a portion of their surfaces can be prepared by the method described in U.S. Pat. Pub. No. 2007/0116942 (D'Souza).

The amino functional groups provide a mechanism to bring about bonding between the hollow glass microspheres and the matrix comprising polyamide and the impact modifier comprising at least one of polyolefin units or polydiene units and at least one of carboxylic acid or carboxylic acid anhydride functional groups. Accordingly, in some embodiments, the hollow glass microspheres and at least one of the polyamide or the impact modifier described above in any of their embodiments can share a bond. The bond may be an amide bond, an imide bond, or a carboxyl-amine non-covalent bond, depending on the functional group on the impact modifier. For example, a maleic anhydride-modified impact modifier can be covalently connected to the amino-functionalized hollow glass microspheres through maleimide groups. Other carboxylic acid anhydride-modified impact modifiers may be connected to the hollow glass microspheres through amide groups. Polyamides or carboxylic acid-modified polyolefins may share a covalent or non-covalent bond with the hollow glass microspheres, for example, a carboxylic acid-amine non-covalent bond. The non-covalent bond can be an ionic bond, hydrogen bond, or dipole interaction.

As described above, the combination of an impact modifier comprising at least one of polyolefin units or polydiene units and at least one of carboxylic acid or carboxylic acid anhydride functional groups and hollow glass microspheres having amino groups on at least a portion of their surfaces can be added to polyamides to provide unexpected impact strengths. Tables 4 and 5 in the Examples, below, compare various compositions according to the present disclosure and illustrative comparable compositions using a low impact strength polyamide-6 and polyamide-6,6. Comparative Examples A and B (CE A and CE B) and CE G and CE H illustrate the drop in impact strength when hollow glass microspheres are added to the polyamide (even when the hollow glass microspheres are treated with aminosilane). This is the same trend for Illustrative Examples IE C and IE D (untreated and treated with aminosilane, respectively), in which a maleic anhydride-functionalized impact modifier was added at low levels (4.4 wt. %). In this comparison, there is unexpectedly a decrease in impact strength with the use of aminosilane-treated hollow glass microspheres in CE D vs CE C. However, in Examples 1, 2, and 3 we see that the impact strength increases appreciably due to the aminosilane treatment on the hollow glass microspheres that also have higher amounts of the impact modifier. The level of increase of impact strength with the presence of more impact modifier in the compound and then typically levels off. In many embodiments, as shown in the Examples, below, at least one of the impact strength, tensile strength, or flexural strength of the compositions according to the present disclosure approach or in some cases even surprisingly exceed the impact strength of the polyamide without the addition of hollow glass microspheres.

As shown in Table 6 in the Examples, below, a maleic anhydride/EPDM-toughened polyamide obtained from E.I. du Pont de Nemours and Co. under the trade designation "ZYTEL 801ST", was used. It is evident from a comparison of Example 4 with Illustrative Example L that the impact strength of the impact-modified polyamide containing aminosilane treated hollow glass microspheres is double that of the impact-modified polyamide including untreated hollow glass microspheres. It is reported in Pisharath, Sreekumar. "Rheology—Morphology Relationships in Nylon—LCP Hybrid Composites". *Composites Science and Technology.* 66, pp. 2971 to 2979, Dec. 1, 2006, that impact-modified polyamide "ZYTEL 801" contains 20 volume percent of maleic anhydride-functionalized EPDM, which is about 16 weight percent and therefore above the critical level of impact modifier needed as described above.

In some embodiments, the composition according to the present disclosure includes a compatibilizer to improve compatibility of two or more of the other components of the composition. For example, the compatibilizer can improve the compatibility of the polyamide with the hollow glass microspheres and/or the impact modifier. In some embodiments, the compatibilizer is a copolymer of an olefin, an acrylate, and a monomer that includes at least one polar functional group. In some embodiments, the polar functional groups comprise at least one of maleic anhydride, carboxylic acid groups, and hydroxyl groups. In some embodiments, the compatibilizer is a maleic anhydride-modified copolymer of an olefin and an acrylate. In some embodiments, the compatibilizer is a maleic anhydride-modified ethylene acrylate copolymer. The acrylate may be, for example, methyl acrylate, ethyl acrylate, or butyl acrylate. Suitable compatibilizers include those available commercially, for example, from BYK, Wesel, Germany, under the trade designation "SCONA" and from E.I. du Pont de Nemours &

Co. under the trade designation "ELVALOY". Compatibilizers disclosed in U.S. Pat. Pub. No. 2006/0105053 (Marx et al.) may also be useful. The level of grafting of the polar functional groups (e.g., the level of grafting of maleic anhydride in the modified ethylene-acrylate copolymer may be in a range from about 0.5-3%, 0.5-2%, 0.8-1.2%, or about 1%).

The compatibilizer can be added to the composition according to the present disclosure in an amount sufficient to improve the mechanical properties of the composition. In some embodiments, the compatibilizer may be present in the composition in an amount greater than two percent, based on the total weight of the composition. In some embodiments, the compatibilizer is present in the composition in amount of at least 2.5, 3, 3.5, or 4 percent, based on the total weight of the composition. In some embodiments, the compatibilizer is present in the composition in amount of up to 10, 9, 8, 7, or 6 weight percent, based on the total weight of the composition.

The data in Table 8 in the Examples, below, show how the impact strength of a polyamide composition can further be improved by including a maleic anhydride-modified ethylene acrylate copolymer as a compatibilizer. A comparison of Examples 5 and 6 shows that adding the compatibilizer to a composition including polyamide, a maleic anhydride-functionalized impact modifier, and amino-functional hollow glass microspheres can double the impact strength of the resulting composition.

In some embodiments, the composition according to the present disclosure includes components other than the polyamide, the impact modifier, amino-functional hollow glass microspheres, and optionally a compatibilizer. For example, the composition can contain other resins such as polyolefins. Examples of polyolefins useful for the compositions according to the present disclosure include those made from monomers having the general structure $CH_2=CHR^{10}$, wherein $R^{10}$ is a hydrogen or alkyl. In some embodiments, $R^{10}$ has up to 10 carbon atoms or from one to six carbon atoms. Examples of suitable polyolefins include polyethylene; polypropylene; poly (1-butene); poly (3-methylbutene); poly (4-methylpentene); copolymers of ethylene with propylene, 1-butene, 1-hexene, 1-octene, 1-decene, 4-methyl-1-pentene, and 1-octadecene; and blends of any of these. In some embodiments, the composition according to the present disclosure comprises at least one of polyethylene or polypropylene. It should be understood that a polyolefin comprising polypropylene may be a polypropylene homopolymer or a copolymer containing propylene repeating units. Useful polyethylene polymers include high density polyethylene (e.g., those having a density of such as from 0.94 to about 0.98 g/cm$^3$) and linear or branched low-density polyethylenes (e.g. those having a density of such as from 0.89 to 0.94 g/cm$^3$). Useful polypropylene polymers include low impact, medium impact, or high impact polypropylene. The polyolefin may comprise mixtures of stereo-isomers of such polymers (e.g., mixtures of isotactic polypropylene and atactic polypropylene). Suitable polypropylenes can be obtained from a variety of commercial sources, for example, LyondellBasell, Houston, Tex., under the trade designations "PRO-FAX" and "HIFAX", and from Pinnacle Polymers, Garyville, La., under the trade designation "PINNACLE". Suitable polyethylenes can be obtained from a variety of commercial sources, for example, Braskem S. A., Sao Paolo, Brazil. Compositions according to the present disclosure can include, in some embodiments, up to 30, 25, 20, 15, 10, or 5 percent by weight of a polyolefin, based on the total weight of the composition.

In some embodiments, the compositions according to the present disclosure and/or useful in the method according to the present disclosure includes one or more stabilizers (e.g., antioxidants or hindered amine light stabilizers (HALS)). Examples of useful antioxidants include hindered phenol-based compounds and phosphoric acid ester-based compounds (e.g., those available from BASF, Florham Park, N.J., under the trade designations "IRGANOX" and "IRGAFOS" such as "IRGANOX 1076" and "IRGAFOS 168", those available from Songwon Ind. Co, Ulsan, Korea, under the trade designations "SONGNOX", and butylated hydroxytoluene (BHT)). Antioxidants, when used, can be present in an amount from about 0.001 to 1 percent by weight based on the total weight of the composition. HALS are typically compounds that can scavenge free-radicals, which can result from photodegradation or other degradation processes. Suitable HALS include decanedioic acid, bis (2,2,6,6-tetramethyl-1-(octyloxy)-4-piperidinyl)ester. Suitable HALS include those available, for example, from BASF under the trade designations "TINUVIN" and "CHIMASSORB". Such compounds, when used, can be present in an amount from about 0.001 to 1 percent by weight based on the total weight of the composition.

Reinforcing filler may be useful in the composition according to the present disclosure and/or useful in the method according to the present disclosure. Reinforcing filler can be useful, for example, for enhancing the tensile, flexural, and/or impact strength of the composition. Examples of useful reinforcing fillers include silica (including nanosilica), other metal oxides, metal hydroxides, and carbon black. Other useful fillers include glass fiber, wollastonite, talc, calcium carbonate, titanium dioxide (including nano-titanium dioxide), wood flour, other natural fillers and fibers (e.g., walnut shells, hemp, and corn silks), and clay (including nano-clay). However, in some embodiments, the presence of such reinforcing fillers in the composition according to the present disclosure can lead to an undesirable increase in the density of the composition. Advantageously, the compositions according to the present disclosure and/or useful in the methods according to the present disclosure provide good mechanical properties even in the absence of reinforcing fillers. As shown in the Examples, below, it has been found that compositions disclosed herein have high tensile, flexural, and impact strength even in the absence of silica filler or other reinforcing filler. Accordingly, in some embodiments, the composition is free of reinforcing filler or contains up to 5, 4, 3, 2, or 1 percent by weight reinforcing filler, based on the total weight of the composition. For example, in some embodiments, the composition is free of glass fibers or contains up to 5, 4, 3, 2, or 1 percent by weight glass fiber, based on the total weight of the composition.

Other additives may be incorporated into the composition disclosed herein in any of the embodiments described above. Examples of other additives that may be useful, depending on the intended use of the composition, include preservatives, mixing agents, colorants, dispersants, floating or antisetting agents, flow or processing agents, wetting agents, anti-ozonant, and odor scavengers. Any of the compositions described herein can include one or more of such additives.

While including hollow glass microspheres in polymeric compositions can provide many benefits, the process of adding glass bubbles into a polymer in a manufacturing process can pose some challenges. Handling glass bubbles may be similar to handling light powders. The hollow glass microspheres may not be easily contained and difficult to use in a clean environment. It can also be difficult to add an accurate amount of hollow glass microspheres to the polymer. Therefore, the present disclosure provides a masterbatch composition useful, for example, for incorporating hollow glass microspheres into a final, end-use thermoplastic composition. Delivering the hollow glass microspheres in a masterbatch composition can eliminate at least some of the handling difficulties encountered during manufacturing.

In a masterbatch composition, the hollow glass microspheres may be present in a range from 30 percent to 55 percent, by weight, based on the total weight of the composition, and the impact modifier may be present in the composition in a range from 30 percent to 70 percent by weight, based on the total weight of the composition. Polyamide may or may not be present in the masterbatch composition.

The present disclosure provides a method of making an article, in which the method includes shaping the composition described above in its embodiments to make the article. Shaping the composition can be carried out by any desirable method, for example, extrusion, compression molding, injection molding, injection-compression molding, blow molding, roto-molding, and thermoforming. Elevated temperatures (e.g., in a range from 100° C. to 325° C.) may be useful for mixing the components of the composition in an extruder. Hollow glass microspheres may be added to the composition after the polyamide, impact modifier, and optionally compatilizer are combined. In some embodiments, articles according to the present disclosure are prepared by injection molding. The method of injection molding the composition disclosed herein can utilize any type of injection molding equipment, generally including a material hopper (e.g., barrel), a plunger (e.g., injection ram or screw-type), and a heating unit.

The composition and method according to the present disclosure are useful for making low density products (e.g., having a density in a range from 0.75 to 1.05, 0.78 to 1.04, or 0.8 to 1.03 grams per cubic centimeter) typically with good tensile strength, flexural strength, and impact resistance, which are useful properties for a variety of applications. Articles that can be made from the compositions according to the present disclosure include cold-weather sports equipment (e.g., skis and ski boots), other sports equipment, interior and exterior automobile components (e.g., hoods, trunks, bumpers, grilles, side claddings, rocker panels, fenders, tail-gates, in wire and cable applications, instrument panels, consoles, interior trim, door panels, heater housings, battery supports, headlight housings, front ends, ventilator wheels, reservoirs, and soft pads), sprocket covers, machine housings, luggage, castor wheels, gears, bearings, and safety helmets.

Some Embodiments of the Disclosure

In a first embodiment, the present disclosure provides a composition comprising:
a polyamide;
hollow glass microspheres having amino groups on at least a portion of their surfaces; and
an impact modifier comprising at least one of polyolefin units or polydiene units and at least one of carboxylic acid or carboxylic acid anhydride functional groups, wherein the impact modifier is present in an amount of at least about 5 weight percent, based on the total weight of the composition.

In a second embodiment, the present disclosure provides the composition of the first embodiment, wherein the impact modifier is a maleic anhydride-modified impact modifier.

In a third embodiment, the present disclosure provides the composition of the first or second embodiment, wherein the impact modifier is an ethylene-propylene elastomer, an ethylene-octene elastomer, an ethylene-propylene-diene elastomer, an ethylene-propylene-octene elastomer, a styrene-butadiene elastomer block copolymer elastomer, or a combination thereof.

In a fourth embodiment, the present disclosure provides the composition of any one of the first to third embodiments, wherein the impact modifier is present in an amount of at least about 10 weight percent, based on the total weight of the composition.

In a fifth embodiment, the present disclosure provides the composition of any one of the first to fourth embodiments, wherein the polyamide comprises at least one of polyamide-6 or polyamide-6,6.

In a sixth embodiment, the present disclosure provides the composition of any one of the first to fifth embodiments, wherein the polyamide is present in an amount of at least 40 weight percent, based on the total weight of the composition.

In a seventh embodiment, the present disclosure provides the composition of any one of the first to sixth embodiments, wherein the hollow glass microspheres are present in an amount of at least 5 weight percent or at least 10 weight percent, based on the total weight of the composition.

In an eighth embodiment, the present disclosure provides the composition of any one of the first to seventh embodiments, wherein the hollow glass microspheres have an average true density in a range from 0.30 grams per cubic centimeter to 0.65 grams per cubic centimeter.

In a ninth embodiment, the present disclosure provides the composition of any one of the first to eighth embodiments, wherein a hydrostatic pressure at which ten percent by volume of the hollow glass microspheres collapses is in a range from about 20 megapascals to about 250 megapascals.

In a tenth embodiment, the present disclosure provides the composition any one of the first to ninth embodiments, further comprising a compatibilizer.

In an eleventh embodiment, the present disclosure provides the composition of the tenth embodiment, wherein the compatibilizer is a maleic anhydride-modified polyolefin-polyacrylate copolymer.

In a twelfth embodiment, the present disclosure provides a method of making an article, the method comprising shaping the composition of any one of the first to eleventh embodiments to make the article.

In a thirteenth embodiment, the present disclosure provides the method of the twelfth embodiment, further comprising heating the composition.

In a fourteenth embodiment, the present disclosure provides the method of the twelfth or thirteenth embodiment, wherein the hollow glass microspheres are functionalized with an aminoalkylsilane.

In a fifteenth embodiment, the present disclosure an article preparable from the composition of any one of the first to eleventh embodiments and/or from the method of any one of the twelfth to fourteenth embodiments.

In a sixteenth embodiment, the present disclosure provides a composition comprising:
a matrix comprising a polyamide modified with an impact modifier comprising at least one of polyolefin units or polydiene units, wherein at least some of the impact modifier and the polyamide share at least one of an amide bond, an imide bond, or a carboxyl-amine noncovalent bond; and
hollow glass microspheres dispersed in the matrix, wherein at least some of the hollow glass microspheres and the matrix share at least one of an amide bond, an imide bond, or a carboxyl-amine noncovalent bond, wherein the impact modifier is present in an amount of at least about 5 weight percent, based on the total weight of the composition.

In a seventeenth embodiment, the present disclosure provides the composition of the sixteenth embodiment, wherein at least some of the impact modifier and the polyamide are covalently attached through an imide.

In an eighteenth embodiment, the present disclosure provides the composition of the sixteenth embodiment, wherein at least some of the impact modifier and the polyamide are covalently attached through a maleimide.

In a nineteenth embodiment, the present disclosure provides the composition of any one of the sixteenth to eighteenth embodiments, wherein the impact modifier is an ethylene-propylene elastomer, an ethylene-octene elastomer, an ethylene-propylene-diene elastomer, an ethylene-propylene-octene elastomer, a styrene-butadiene block copolymer elastomer, or a combination thereof.

In a twentieth embodiment, the present disclosure provides the composition of any one of the sixteenth to nineteenth embodiments, wherein the impact modifier is present in an amount of at least about 10 weight percent, based on the total weight of the composition.

In a twenty-first embodiment, the present disclosure provides the composition of any one of the sixteenth to twentieth embodiments, wherein the polyamide comprises at least one of polyamide-6 or polyamide-6,6.

In a twenty-second embodiment, the present disclosure provides the composition of any one of the sixteenth to twenty-first embodiments, wherein the polyamide is present in an amount of at least 40 weight percent, based on the total weight of the composition.

In a twenty-third embodiment, the present disclosure provides the composition of any one of the sixteenth to twenty-second embodiments, wherein the hollow glass microspheres are present in an amount of at least 5 weight percent or at least 10 weight percent, based on the total weight of the composition.

In a twenty-fourth embodiment, the present disclosure provides the composition of any one of the sixteenth to twenty-third embodiments, wherein the hollow glass microspheres have an average true density in a range from 0.30 grams per cubic centimeter to 0.65 grams per cubic centimeter.

In a twenty-fifth embodiment, the present disclosure provides the composition of any one of the sixteenth to twenty-fourth embodiments, wherein a hydrostatic pressure at which ten percent by volume of the hollow glass microspheres collapses is in a range from about 20 megapascals to about 250 megapascals.

In a twenty-sixth embodiment, the present disclosure provides the composition any one of the sixteenth to twenty-fifth embodiments, further comprising a compatibilizer.

In a twenty-seventh embodiment, the present disclosure provides the composition of the twenty-sixth embodiment, wherein the compatibilizer is polyolefin-polyacrylate copolymer, and wherein the polyolefin-polyacrylate and the matrix are covalently attached through an imide.

In a twenty-eighth embodiment, the present disclosure provides the composition of the twenty-sixth embodiment, wherein the compatibilizer is polyolefin-polyacrylate copolymer, and wherein the polyolefin-polyacrylate and the matrix are covalently attached through a maleimide.

In a twenty-ninth embodiment, the present disclosure provides an article comprising the composition of any one of the sixteenth to twenty-eight embodiments.

In a thirtieth embodiment, the present disclosure provides the article of the fifteenth or twenty-ninth embodiment, wherein the article is a piece of sports equipment, a piece of cold-weather sports equipment, an interior and exterior automobile component, a sprocket cover, a machine housing, a piece of luggage, a castor wheel, a gear, a bearing, or a safety helmet.

EXAMPLES

The following specific, but non-limiting, examples will serve to illustrate the invention. In these examples, all amounts are expressed in parts per hundred resin (phr) unless specified otherwise. In these examples, N/M means "not measured" and "HGM" means "hollow glass microspheres".

Materials

| Trade Designation | Chemical Description | Function | Supplier |
|---|---|---|---|
| "ZYTEL 101 L" nylon resin | Low impact strength nylon 66 | Thermoplastic resin host | E.I. du Pont de Nemours and Co., Wilimington, DE |
| "ZYTEL 801ST" nylon resin | High impact strength modified nylon 66 (known to contain 20% by volume maleic anhydride modified EPDM). | Thermoplastic resin host | E.I. du Pont de Nemours and Co. |
| "CAPRON 8202" | Low impact strength nylon 6 | Thermoplastic resin host | BASF, Engineering Plastics, Wyandotte, MI |
| "3M GLASS BUBBLES iM16k" | Hollow glass microspheres with an average diameter of 20 μm, density of 0.46 g/cm$^3$ and a compressive stength of 16500 psi | Hollow glass microspheres | 3M Company, St. Paul, MN |
| "L20090M" | "3M GLASS BUBBLES iM16K" with aminosilane coating | Treated hollow glass microspheres | 3M Company, |
| "ROYALTUF 498" Impact modifier | Maleic anhydride modified ethylene/propylene non-conjugated diene elastomer | Functionalized Impact modifier | Addivant, Danbury, CT |
| "FUSABOND 493" functional copolymer | Anhydride modified ethylene copolymer | Functionalized Impact modifier | E.I. du Pont de Nemours and Co. |
| "SCONA TSEB 2113 GB" modifier | Ethylene butyl acrylate copolymer functionalized with maleic anhydride | compatibilizer | BYK, Wesel, Germany |

Test Methods

Density

Density of the molded parts was determined using the following procedure. First, the molded parts were exposed to high temperature in an oven (Nabertherm® N300/14) in order to volatilize the polymer resin. The oven was set with a temperature ramp profile to run from 200° C. to 550° C. in 5 hours. After the temperature reached 550° C., it was kept constant for 12 hours. Weight percent of glass bubbles was calculated from the known amounts of molded part before and after the burn process using the following equation:

Weight % of Glass Bubbles=(Weight of Residual Inorganics After Burn)/(Weight of Molded Material Before Burn)×100

We then determined the density of the glass bubble residue ($d_{GB}$) using a helium gas pycnometer (AccuPcy 1330 from Micromeritics). Finally, the molded part density was calculated from the known weight percent of glass bubble residue (W % GB), weight percent of polymer phase (1-w % GB), the density of glass bubble residue ($d_{GB}$) and the known polymer density ($d_{polymer}$) from supplier datasheet.

$$\rho_{molded\ part} = \frac{1}{\frac{W\ \%_{GB}}{d_{GB}} + \frac{W\ \%_{polymer}}{d_{polymer}}}$$

Mechanical Properties

Mechanical properties of the injection-molded composites were measured using ASTM standard test methods listed in Table. An MTS frame with a 5 kN load cell and tensile and 3 point bending grips were used for tensile and flexural properties, respectively. In tensile testing mode, the test procedure described in ASTM D-638-10 standard was followed, however no strain gauge was used, and instead, grip separation distance was used to determine the sample elongation. A Tinius Olsen model IT503 impact tester and its specimen notcher were used to measure room temperature Notched Izod impact strength of the molded parts. A Tinius Olsen MP200 extrusion plastometer was used for melt flow index testing on samples. At least 5 different specimens from a given sample were tested in all tensile, flexural, and impact tests. Arithmetic average of the results were determined and reported in the following examples. The results were observed to be highly repeatable and the standard deviation in test results was observed to be in the range of 3-5% or lower. At least two different specimens were tested in melt flow index tests. The melt flow tests were observed to be highly repeatable with almost identical experimental results. Arithmetic average of the results were determined and reported in the following examples.

TABLE 1

Property Test Methods

| Test (Unit) | Abbr. | ASTM # |
|---|---|---|
| Tensile Modulus (MPa) @ °20 C. | TM | D-638-10 |
| Tensile Strength at yield (MPa) °20 C. | TS | D-638-10 |
| Elongation at break (%) | EL | D-638-10 |
| Notched Izod Impact @ °20 C. (J/m) | NI | D-256-10 |
| Flexural Modulus (MPa) | FM | D-790-10 |
| Flexural Strength at yield (MPa) | FS | D-790-10 |
| Melt Flow Index | MFI | D-1238-13 |

Compounding Procedure

Samples were compounded in a co-rotating intermeshing 1 inch twin screw extruder (L/D: 25) equipped with 7 heating zones. Nylon pellets, the impact modifier (if used) and compatibilizer (if used) were dry blended and fed in zone 1 via a resin feeder and then passed through a set of kneading blocks and conveying elements to ensure its complete melting before hollow glass microspheres (HGM) were side fed downstream in zone 4. At the point of HGM side feeding as well as for the rest of the downstream processing, high channel depth conveying elements (OD/ID: 1.75) were used.

The temperature in zone 1 was set to 260° C. and all other zones to 300° C. for Nylon 66 grades. When compounding Nylon 6 grades, the temperature in zone 1 was set to 260° C. and all other zones to 295° C. The screw rotation speed was set to 250 rpm. The extrudate was cooled in a water bath and pelletized.

Injection Molding Procedure

All samples were molded using a BOY22D injection molding machine with a 28 mm general purpose barrel and screw manufactured by Boy Machines Inc., Exton, Pa. A standard ASTM mold with cavities for tensile, flex and impact bar was used for all molded parts. The injection molded specimens were wrapped in air tight aluminum foils and zip lock bags and kept in a desiccator at room temperature before they were tested. Testing was done no later than 24 hrs.

Incorporation of Hollow Glass Microspheres into Polyamide

As seen in Tables 2 and 3, below, the use of hollow glass microspheres benefits nylon articles by lowering density although it also has a negative effect on impact strength, more so with high impact nylons than with low impact nylons.

TABLE 2

Effect of hollow glass microspheres on impact strength of high impact strength nylon

| | Nylon | | Nylon with hollow glass microspheres | |
|---|---|---|---|---|
| Component | Wt % | Vol % | Wt % | Vol % |
| "ZYTEL 801ST" nylon resin | 100 | 100 | 90 | 79 |
| "iM16K" hollow glass microspheres | — | — | 10 | 21 |
| Density | 1.080 | | 0.962 | |
| Tensile Strength @ 20° C. (Mpa) | 45.6 | | 46.5 | |
| Tensile Modulus @ 0° C. (Mpa) | 1693 | | 2012 | |
| Tensile Elongation % | 30 | | 3.5 | |
| Flexural Strength (Mpa) | 65.0 | | 72.8 | |
| Flexural Modulus @1% secant (Mpa) | 1389 | | 1497 | |
| Flexural Modulus @2% secant (Mpa) | 1376 | | 1751 | |
| Izod impact Strength at 20° C.-Notched (J/m) | 825 | | 57 | |

TABLE 3

Effect of hollow glass microspheres on impact strength of low impact strength nylon

| | Nylon | | Nylon with hollow glass microspheres | |
|---|---|---|---|---|
| Component | Wt % | Vol % | Wt % | Vol % |
| "ZYTEL 101 L" nylon resin | 100 | 100 | 93.5 | 86.6 |
| "iM16K" hollow glass microspheres | — | — | 6.5 | 13.4 |
| Density | 1.140 | | 1.055 | |

TABLE 3-continued

Effect of hollow glass microspheres on impact strength of low impact strength nylon

| Component | Nylon Wt % | Nylon Vol % | Nylon with hollow glass microspheres Wt % | Nylon with hollow glass microspheres Vol % |
|---|---|---|---|---|
| Tensile Strength @ 20° C. (Mpa) | 82 | | 75 | |
| Tensile Modulus @ 20° C. (Mpa) | 2590 | | 2765 | |
| Flexural Strength (Mpa) | 117 | | 114 | |
| Flexural Modulus @2% secant (Mpa) | 2455 | | 2710 | |
| Izod impact Strength at 20° C.-Notched (J/m) | 55 | | 30 | |

TABLE 4

Nylon 6 with functionalized impact modifier and hollow glass microspheres

| | CE A | | CE B | | IE C | | IE D | | IE E | | EX1 | | IE F | | EX2 | |
|---|---|---|---|---|---|---|---|---|---|---|---|---|---|---|---|---|
| | Wt % | Vol % | Wt % | Vol % | Wt % | Vol % | Wt % | Vol % | Wt % | Vol % | Wt % | Vol % | Wt % | Vol % | Wt % | Vol % |
| "CAPRON 8202" nylon 6 | 100 | 100 | 94 | 88.2 | 93.2 | 86.8 | 89.1 | 82.2 | 88.7 | 81.6 | 83.4 | 75.8 | 82.7 | 74.5 | 77.7 | 69.1 | 78.5 | 70.5 |
| "iM16K" | — | — | 6 | 11.8 | | | 6.5 | 12.5 | | | 6.4 | 12.2 | | | 7.3 | 13.6 | | |
| "L20090M" | | | | | 6.8 | 13.2 | | | 6.8 | 13.2 | | | 7.3 | 13.8 | | | 6.3 | 11.9 |
| "ROYALTUF 498" | — | — | — | — | — | — | 4.4 | 5.3 | 4.4 | 5.3 | 10.1 | 11.9 | 10.0 | 11.7 | 15.0 | 17.3 | 15.2 | 17.7 |
| Density | 1.132 | | 1.057 | | 1.057 | | 1.030 | | 1.030 | | 1.014 | | 1.000 | | 0.996 | | 1.011 | |
| Tensile Strength @ 20° C. (Mpa) | 83.6 | | 63.3 | | 75.7 | | 56.8 | | 70.3 | | 54.8 | | 60.2 | | 52.2 | | 52.8 | |
| Tensile Elongation @ 20° C. (Mpa) | 12.2 | | 10.1 | | 3.1 | | 11.1 | | 12.9 | | 3.7 | | 12.1 | | 4.8 | | 13.6 | |
| Tensile Modulus @ 20° C. (Mpa) | 2518 | | 2625 | | 2677 | | 2494 | | 2483 | | 2099 | | 2103 | | 1982 | | 2008 | |
| Flexural Strength (Mpa) | 121.1 | | 108.6 | | 123.3 | | 92.6 | | 104.4 | | 80.6 | | 90.7 | | 75.3 | | 78.5 | |
| Flexural Modulus (Mpa) | 2955 | | 3140 | | 3112 | | 2875 | | 2910 | | 2235 | | 2538 | | 2235 | | 2267 | |
| Izod impact Strength at 20° C. - Notched (J/m) | 46.2 | | 26.4 | | 25.7 | | 37.7 | | 29.9 | | 43.3 | | 69.6 | | 54.2 | | 91.4 | |

TABLE 5

Nylon 66 with functionalized impact modifier and hollow glass microspheres

| | CE G | | CE H | | IE I | | IE J | | IEK | | EX3 | |
|---|---|---|---|---|---|---|---|---|---|---|---|---|
| | Wt % | Vol % | Wt % | Vol % | Wt % | Vol % | Wt % | Vol % | Wt % | Vol % | Wt % | Vol % |
| "ZYTEL 101" nylon 66 | 100 | 100 | 93.5 | 86.6 | 93.5 | 86.2 | 92.08 | 84.8 | 91.2 | 83.8 | 88.5 | 80.9 | 89.1 | 81.7 |
| "iM16K" | | | 6.5 | 13.4 | | | | | | | 7 | 14 | | |
| "L20090M" | | | | | 6.9 | 13.8 | 7.0 | 13.9 | 6.8 | 13.8 | | | 6.5 | 13.0 |
| "ROYALTUF 498" | — | — | — | — | — | — | 1.02 | 1.2 | 2.0 | 2.4 | 4.5 | 5.1 | 4.4 | 5.3 |
| Density | 1.140 | | 1.055 | | 1.053 | | 1.050 | | 1.048 | | 1.040 | | 1.044 | |
| Tensile Strength @ 20° C. (Mpa) | 82 | | 75 | | 81.1 | | 79.1 | | 79.6 | | 64 | | 73.8 | |
| Tensile Modulus @ 20° C. Mpa | 2590 | | 2765 | | 2653 | | 2550 | | 2540 | | 2460 | | 2430 | |
| Flexural Strength (Mpa) | 117 | | 114 | | 125.0 | | 123.2 | | 118.6 | | 95 | | 111.4 | |
| Flexural Modulus (Mpa) | 2455 | | 2710 | | 3165 | | 3156 | | 3034 | | 2275 | | 2881 | |

TABLE 5-continued

Nylon 66 with functionalized impact modifier and hollow glass microspheres

| | CE G | | CE H | | IE I | | IE J | | IEK | | EX3 | |
|---|---|---|---|---|---|---|---|---|---|---|---|---|
| | Wt % | Vol % | Wt % | Vol % | Wt % | Vol % | Wt % | Vol % | Wt % | Vol % | Wt % | Vol % |
| Izod impact Strength at 20° C. - Notched (J/m) | 55.0 | | 30.0 | | 30 | | 36.1 | | 34.2 | | 48.0 | 54.3 |

TABLE 6

Effect of hollow glass microspheres on high impact strength nylon

| | Nylon only | | IE L | | EX4 | |
|---|---|---|---|---|---|---|
| | Wt % | Vol % | Wt % | Vol % | Wt % | Vol % |
| "ZYTEL 801ST" High Impact Nylon 66 | 100 | 100 | 90 | 81.3 | 90 | 81.3 |
| "iM16K" | | | 10 | 18.8 | — | — |
| "L20090M" | — | — | — | — | 10 | 18.8 |
| Density | | 1.080 | | 0.962 | | 0.975 |
| Tensile Strength @ 20° C. (Mpa) | | 45.6 | | 46.5 | | 48.8 |
| Tensile Modulus @ 20° C. (Mpa) | | 1693 | | 2012 | | 2034 |
| Tensile Elongation % | | 30 | | 3.5 | | 18.1 |
| Flexural Strength (Mpa) | | 65.0 | | 72.8 | | 76.0 |
| Flexural Modulus @1% secant (Mpa) | | 1389 | | 1497 | | 1500 |
| Flexural Modulus @2% secant (Mpa) | | 1376 | | 1751 | | 1804 |
| Izod impact Strength at 20° C. - Notched (J/m) | | 825 | | 57 | | 122 |

Table 7 compares the use of aminosilane coated HGMs and no impact modifier versus uncoated HGMs and a high level of impact modifier (10 wt %) because one might think that this high level of impact modifier would be advantageous. Although the impact levels are also improved due to the use of more impact modifier, the tensile strength and modulus is further reduced compared to the aminosilane treated HGM case only.

TABLE 7

Effect of high level of impact modifier and uncoated hollow glass microspheres

| | Nylon 66 only | | Ex 4 Nylon 66 + aminosilane coated HGM's | | IE N Nylon 66 + uncoated HGM's + FIM | |
|---|---|---|---|---|---|---|
| Component | Wt % | Vol % | Wt % | Vol % | Wt % | Vol % |
| "ZYTEL 801ST" High Impact Nylon 66 | 100 | 100 | 90 | 81.3 | 80 | 70.7 |
| "iM16K" | — | — | — | — | 10 | 18.4 |
| "L20090M" | — | — | 10 | 18.8 | — | — |
| "FUSABOND 493" functional copolymer | — | — | — | — | 10 | 11 |
| Density | | 1.080 | | 0.975 | | 0.944 |
| Tensile Strength @ 20° C. (Mpa) | | 45.6 | | 48.8 | | 35.0 |
| Tensile Modulus @ 20° C. (Mpa) | | 1693 | | 2034 | | 1602 |
| Tensile Elongation % | | 30 | | 18.1 | | 6.9 |
| Flexural Strength (Mpa) | | 65.0 | | 76.0 | | 55.0 |
| Flexural Modulus @1% secant (Mpa) | | 1389 | | 1500 | | 1447 |
| Flexural Modulus @2% secant (Mpa) | | 1376 | | 1804 | | 1320 |
| Izod impact Strength at 20° C. - Notched (J/m) | | 825 | | 122 | | 100 |

In Table 8 we show how the impact strength can further be improved via the use of impact modifier plus added glass compatibilizer.

TABLE 8

Further impact strength improvement via the use of added compatibilizer

| Component | Wt % | Vol % | IE O Wt % | IE O Vol % | EX5 Wt % | EX5 Vol % | IE P Wt % | IE P Vol % | EX6 Wt % | EX6 Vol % |
|---|---|---|---|---|---|---|---|---|---|---|
| "ZYTEL 801ST" Nylon-66 | 100 | 100 | 83 | 75.5 | 83 | 75.5 | 88 | 81.2 | 78 | 70.4 |
| "iM16K" | — | — | 7 | 13.2 | — | — | — | — | — | — |
| "L20090M" | — | — | — | — | 7 | 13.2 | 7 | 13.4 | 7 | 13.1 |
| "SCONA TSEB 2113 GB" compatibilizer | — | — | — | — | — | — | 5 | 5.4 | 5 | 5.2 |
| "ROYALTUF 498" | — | — | 10 | 11.3 | 10 | 11.3 | — | — | 10 | 11.2 |
| Density | | 1.08 | | 0.986 | | 0.988 | | 1.000 | | 0.974 |
| Tensile Strength @ 20° C. (Mpa) | | 45.7 | | 34.4 | | 36.4 | | 42.7 | | 33.4 |
| Tensile Modulus @ 20° C. (Mpa) | | 1673 | | 1560 | | 1513 | | 1718 | | 1229 |
| Tensile Elongation % | | 30 | | 8.6 | | 26.7 | | 21 | | 24.8 |
| Flexural Strength (Mpa) | | 65.2 | | 51.0 | | 52.0 | | 45.9 | | 45.9 |
| Flexural Modulus @1% secant (Mpa) | | 1385 | | 1300 | | 1358 | | 1456 | | 1233 |
| Flexural Modulus @2% secant (Mpa) | | 1342 | | 1200 | | 1196 | | 1398 | | 1027 |
| Izod impact Strength at 20° C. - Notched (J/m) | | 834 | | 110 | | 197 | | 144 | | 356 |

This disclosure is not limited to the above-described embodiments but is to be controlled by the limitations set forth in the following claims and any equivalents thereof. This disclosure may be suitably practiced in the absence of any element not specifically disclosed herein.

What is claimed is:

1. A composition comprising:
   a polyamide;
   hollow glass microspheres having amino groups on at least a portion of their surfaces; and
   a maleic anhydride-modified impact modifier comprising at least one of polyolefin or polydiene units, wherein the maleic anhydride-modified impact modifier is present in an amount of at least about 5 weight percent, based on the total weight of the composition, and wherein the maleic anhydride-modified impact modifier is an ethylene-propylene elastomer, an ethylene-octene elastomer, an ethylene-propylene-diene elastomer, an ethylene-propylene-octene elastomer, a styrene-butadiene elastomer, or a combination thereof.

2. The composition of claim 1, wherein the maleic anhydride-modified impact modifier is a maleic anhydride-modified ethylene-propylene-diene elastomer.

3. The composition of claim 1, further comprising a compatibilizer.

4. A composition comprising:
   a polyamide;
   hollow glass microspheres having amino groups on at least a portion of their surfaces;
   a compatibilizer; and
   an impact modifier comprising at least one of polyolefin or polydiene units and at least one of carboxylic acid or carboxylic acid anhydride functional groups,
   wherein the impact modifier is present in an amount of at least about 5 weight percent, based on the total weight of the composition, and wherein the compatibilizer is a maleic anhydride-modified polyolefin-polyacrylate copolymer.

5. A composition comprising:
   a matrix comprising a polyamide modified with an impact modifier comprising at least one of polyolefin or polydiene units, wherein at least some of the impact modifier and the polyamide are covalently attached through an imide; and
   hollow glass microspheres dispersed in the matrix, wherein at least some of the hollow glass microspheres and the matrix share at least one of an amide bond, an imide bond, or a carboxyl-amine noncovalent bond,
   wherein the impact modifier is present in an amount of at least about 5 weight percent, based on the total weight of the composition, and wherein the impact modifier is an ethylene-propylene elastomer, an ethylene-octene elastomer, an ethylene-propylene-diene elastomer, an ethylene-propylene-octene elastomer, a styrene-butadiene elastomer, or a combination thereof.

6. The composition of claim 5, wherein the impact modifier is an ethylene-propylene-diene elastomer.

7. The composition of claim 5, further comprising a compatibilizer.

8. A composition comprising:
   a matrix comprising a polyamide modified with an impact modifier comprising at least one of polyolefin or polydiene units, wherein at least some of the impact modifier and the polyamide share at least one of an amide bond, an imide bond, or a carboxyl-amine noncovalent bond;
   a compatibilizer; and
   hollow glass microspheres dispersed in the matrix, wherein at least some of the hollow glass microspheres and the matrix share at least one of an amide bond, an imide bond, or a carboxyl-amine noncovalent bond,
   wherein the impact modifier is present in an amount of at least about 5 weight percent, based on the total weight of the composition, wherein the compatibilizer is polyolefin-polyacrylate copolymer, and wherein the polyolefin-polyacrylate copolymer and the matrix are covalently attached through an imide.

9. The composition of claim 4, wherein the impact modifier is an ethylene-propylene elastomer, an ethylene-octene elastomer, an ethylene-propylene-diene elastomer, an ethylene-propylene-octene elastomer, a styrene-butadiene elastomer, or a combination thereof.

10. The composition of claim 1, wherein the maleic anhydride-modified impact modifier is present in an amount of at least about 10 weight percent, based on the total weight of the composition.

11. The composition of claim 1, wherein the polyamide comprises at least one of polyamide-6 or polyamide-6,6.

12. The composition of claim 1, wherein the hollow glass microspheres are present in an amount of at least 5 weight percent, based on the total weight of the composition.

13. The composition of claim 1, wherein the hollow glass microspheres have an average true density in a range from 0.30 grams per cubic centimeter to 0.65 grams per cubic centimeter.

14. The composition of claim 1, wherein a hydrostatic pressure at which ten percent by volume of the hollow glass microspheres collapses is in a range from about 20 megapascals to about 250 megapascals.

15. An article comprising the composition of claim 1.

16. The composition of claim 8, wherein the polyolefin-polyacrylate copolymer and the matrix are covalently attached through a maleimide.

17. The composition of claim 1, wherein the polyamide is present in an amount of at least 40 weight percent, based on the total weight of the composition.

18. A method of making an article, the method comprising shaping the composition of claim 1 to make the article.

19. The method of claim 18, further comprising heating the composition.

20. The method of claim 18, wherein the hollow glass microspheres are functionalized with an aminoalkylsilane.

\* \* \* \* \*